United States Patent [19]
Miller, Jr. et al.

[11] 3,780,956
[45] Dec. 25, 1973

[54] LIQUID LEVEL CONTROL FOR PULPING APPARATUS

[75] Inventors: Blaine Monroe Miller, Jr., Malvern; Wayne T. Buckman, Pipersville; Ellis R. Warner, Jr., West Chester, all of Pa.

[73] Assignee: The Hobart Manufacturing Company, Troy, Ohio

[22] Filed: Sept. 28, 1971

[21] Appl. No.: 184,460

[52] U.S. Cl............... 241/34, 241/46.11, 241/46.17
[51] Int. Cl. .......................................... B02c 13/14
[58] Field of Search..................... 241/34, 37, 46.11, 241/46.17, 33, 46; 137/386, 387, 403, 406; 200/83 R, 83 A, 83 N, 83 Q, 83 T

[56] References Cited
UNITED STATES PATENTS

| 2,796,066 | 6/1957 | Chaplin................................ 241/34 |
| 3,344,804 | 10/1967 | Lyman................................ 137/406 |
| 3,058,672 | 10/1962 | Zabel..................................... 241/37 |
| 3,498,091 | 3/1970 | Mason ........................... 137/387 X |
| 3,545,481 | 12/1970 | Fratalia.......................... 137/406 X |

*Primary Examiner*—Granville Y. Custer, Jr.
*Attorney*—J. Herman Yount, Jr. et al.

[57] ABSTRACT

A liquid level control is provided for a pulping apparatus, wherein the pulping apparatus is of the type that is adapted to receive waste and other debris, along with water, for abrading or otherwise comminuting the waste in a water medium within the pulper, and then for discharging a slurry formed thereby, wherein the liquid level within the pulper must continuously or periodically be replaced. A closed-ended vertically disposed line is tapped into the lower end of the pulper, and adapted to receive liquid therein, with air being trapped at the upper end of the vertically disposed member. The trapped air is adapted for actuating a switch, which in turn actuates a valve or other suitable means for controlling the amount of water or other liquid to be supplied to the pulper. A pressure gauge may also be provided at the upper end of the closed-ended tubular member, in order to give a visual indication of the pressure of the trapped air. Also, a restricter may be provided between the lower end of the vertically disposed tubular member and the trapped air at the upper end that actuates the switch, for the purpose of retarding fluctuations, or providing a dampening effect with respect to fluctuations attendant to substantially instantaneous reductions in water level and/or pressure within the pulper.

9 Claims, 2 Drawing Figures

PATENTED DEC 25 1973 3,780,956

INVENTORS.
BLAINE MONROE MILLER, JR.
WAYNE T. BUCKMAN
ELLIS R. WARNER

BY *Paul + Paul*
ATTORNEYS.

LIQUID LEVEL CONTROL FOR PULPING APPARATUS

BACKGROUND OF THE INVENTION

In the recent past, efforts have been made to provide various types of pulping apparatus, which function in order to provide a slurry-like reduction of solids, with water, and to further treat such slurry, as by removal of heavy metal components, if desired, and then to either disseminate such slurry into a sewage line, or to subject such slurry to a pressing action, for removal of water therefrom, with the solids thus being removed from the water, for transport to a dumping, burning location or the like, as desired, after having undergone a reduction of about eighty percent of the volume of the waste originally present prior to the pulping action.

One example of such a pulping apparatus is that disclosed in U.S. Pat. No. 3,489,356, the disclosure of which is herein incorporated by reference. One example of a press of the type discussed above is that disclosed in U.S. Pat. No. 3,426,677, the dislosure of which is also herein incorporated by reference.

It will be apparent, that, during the operation of a pulper (or pulping apparatus), substantial quantities of water are utilized, such water also often being recirculated after being removed in a pressing operation, back into the pulping apparatus. In any event, water must either continuously, if desired, or periodically, be provided to the pulper, as water and waste are discharged in slurry formed from the pulper, in that an impeller usually associated with the pulper and located at the bottom thereof functions best in performing its abrading or comminuting operation upon waste components deposited into the pulper when in a liquid medium. Likewise, other types of severing, cutting, operations and the like are best performed in a water or like liquid medium.

In some instances, it may be possible to have an operator on hand during the comminution of waste in a pulper, such that water could be replenished as needed. However, in most instances, such will not be economical, or even desirable, either because a continuously present operator cannot be provided, or because such operator would normally be busy dumping waste into the pulper, and would not have sufficient time to constantly watch and keep control over the water level therein. Accordingly, some type of water level control for a pulping apparatus becomes desirable. However, conventional floating types of water level controls, that would be placed within a pulper are highly undesirable, because of the violent action that takes place within the pulper, due to the rotation of the impeller and the dissemination and scattering of various waste components and water, within the pulper. Because of all of this, an internally disposed floating type of water level control becomes highly impractical, in that the water level within the pulper is constantly fluctuating, both because of discharge from the pulper, and because of the turbulence provided by the impeller. Furthermore, flying debris within the pulper may damage a level control disposed therein. Also, various types of highly sensitive and complicated electronic and pneumatic control devices may perhaps be available, but generally such are prophibitively expensive for most pulper installations.

SUMMARY OF THE INVENTION

The present invention is directed toward overcoming the above limitations of pulpers and control devices therefor, in providing a liquid level control adapted for a pulping apparatus, that is generally disposed outside the pulper, and is constructed of a few simple components, and which is not substantially adversely affected by fluctuations due to minor liquid level variations within the pulper, or due to the violent action of the impeller.

Accordingly, it is a primary object of this invention to provide a novel liquid level control for a pulping apparatus, wherein such control is operative depending upon a trapped column of air disposed outside the pulping apparatus, connected to the bottom of the pulping tank, and having an air-pressure sensitive device at the upper end of the column, connectable for actuation of a liquid level supply to the pulper.

It is a further object of this invention to accomplish the above object, wherein the air column functions as a sump for reducing and/or eliminating undesirable liquid level fluctuations.

It is another object of this invention to accomplish either of the objects set forth above, wherein the air-pressure sensitive element is adapted for actuation of a switch, which in turn actuates a water inlet valve which may, if desired, be of the solenoid type.

It is a further object of this invention to accomplish any of the objects set forth immediately above, wherein the air column is connected to the bottom of the pulper in a location adapted to receive water that has been subjected to sufficient turbulence by the impeller that entrained air particles are presented to the air column, to pass through liquid at the bottom of the column, after initial operation, and to then replace water or other liquid within the column, thereby further providing a sump type action for even further reduction of pressure fluctuations within the closed upper end of the air column.

Other objects and advantages of the present invention will become readily apparent from a reading of the following brief description of the drawing figures, detailed description of the preferred embodiment, and the appended claims.

IN THE DRAWINGS

Figure 1:
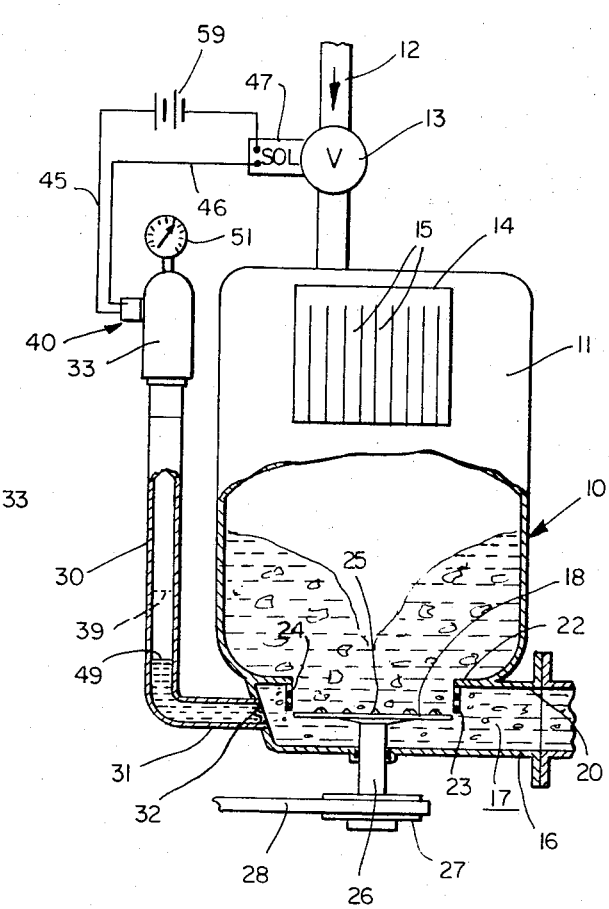
FIG. 1 is an elevational view, with portions broken away for sectional illustration, of a pulping apparatus of this invention, with the liquid level control therefor being illustrated, also partially in section, with liquid being illustrated in the pulping apparatus.

Referring now to the drawings in detail, reference is first made to FIG. 1, wherein there is illustrated a pulper or pulping apparatus, generally designated by the numeral 10, as comprising a tank 11, having a water or other liquid inlet line 12, with a valve 13 disposed in the line 12, for opening or closing the line 12 in order to permit entry of water or the like therein. An opening or doorway 14 is provided, for the dumping or placement of trash and other waste debris therethrough, with a plurality of flaps 15 being provided, hanging from the upper end of the doorway 14, in order to prevent rotating debris within the pulper 10 from being thrown outwardly thereof.

The pulping tank 11 has a lower wall 16, which defines a zone 17 beneath an impeller 18, through which pulped slurry passes on its way to discharge from a slurry discharge tube 20, to some suitable depository.

Above the tank 16, there is located the disk-like impeller 18, disposed slightly below and radially inwardly of an inturned annulus 22 of the tank 11. Between the annulus 22 and the periphery of the disk 18, there is provided a sizing ring 23, having a plurality of voids 24 therein of a preselected size, determined by the desired size of particles to pass therethrough, and to comprise with water entering the tank 11 through the line 12, a discharge slurry. The impeller plate 18 is provided with a plurality of abrading teeth 25, which are adapted to comminute, sever, tear and otherwise reduce in size any waste placed into the tank 11, with the impeller plate 18 being adapted for rotation provided by a rotating shaft 26, driven by a pulley 27 and belt 28, which in turn is driven from a suitable motor (not shown) or the like.

An air column is formed by a generally tubular member 30, having a lower end thereof bent substantially at right angles as at 31, and communicatively connected to the lower zone 17, at the lower end of the tank 11, as at 32. A screen or the like, if desired, may be placed across the lower end 32 of the inlet to the tubular member 30, in order to keep small debris particles present in the slurry from entering the tube 30, if desired.

The bent lower end 31 of the tubular member may be upwardly inclined, if desired, between the point of its connection with the lower end of the tank 11, and the vertically disposed portion of the tubular member 30, if desired, in order to facilitate the upward passage of entrained air particles from slurry in the zone 17 to the vertical portion of the tubular member 30, if desired, for reasons later to be discussed herein.

The upper-most end 33 of the tubular member 30 that forms the air column is separated from the remainder of the column 30 by a restricter 34. The restricter 34 may have male and female threaded ends 35 and 36, if desired, respectively located on upper and lower ends thereof. This will facilitate connection to the main portion of the vertically disposed member 30, and to the upper end 33 of the air column forming member. The restricter 34 may comprise an outer casing 37, filled with an air-permeable substance, such as sintered bronze, if desired, of a desired selected porosity, that will permit passage of air into the interior of the upper end 33, from the main portion of the tubular member 30, at a control rate that will not subject the pressure-sensitive elements that will be discussed below to minor fluctuations for minor liquid level variations within the tank 11, or from turbulence or the like.

A switching means generally designated by the numeral 40 is provided, and may be threaded into the side of the upper portion 33 of the vertically disposed tubular member, with such switching means 40 comprising a flexible diaphragm 41 that is operatively responsive to pressure drop within the chamber 42 above atmospheric pressure, with rightward bulbous movement of the diaphragm 41, which in turn is connected by suitable electric wires or the like 45 and 46, through switch elements 43 and 44 to solenoid 47 that is mounted on and operatively connected to valve 13, for actuation of the valve 13, or some other liquid inlet control.

Figure 2:
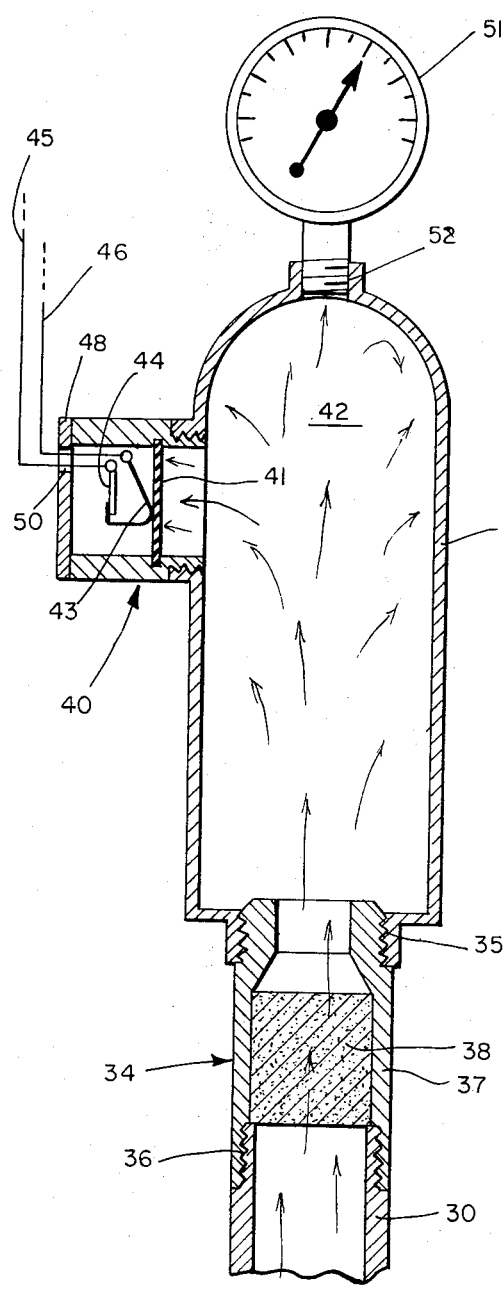
FIG. 2 is an enlarged fragmentary vertical sectional view, taken through the upper end of the air column of this invention, and wherein the restricter and air-pressure responsive switch are more clearly illustrated, with the switch component being generally schematically illustrated.

The switching device 40 may be provided with an end plate 48 that has one or more ports 50 therein, in order to maintain the left-most side of the diaphragm 41, as viewed in FIG. 2, at atmospheric pressure.

A pressure gauge 51, of any suitable type, may be mounted in the upper end 33 of the tubular member, by means of a threaded nipple 52 or the like, as desired. The face of the gauge 51 may be provided with suitable indicia for indicating the internal pressure of the zone 42, above atmospheric pressure.

It will be understood that a suitable electric power source 59 will be provided for actuating the solenoid, either powered by a battery or an electric line. Furthermore, if the switch means 40 were desired to be completely mechanically actuated, some other types of valves, such as a bellows valve may be utilized, if desired.

In operation, upon permitting the valve 13 to open and water to pass from the line 12 into the tank 11, and upon dumping debris into the tank 11, the motor adapted for driving the impeller 18 would be actuated, and the particles and water will assume a vortex such as that illustrated in FIG. 1, with the waste and other particles being subjected to abrading, comminution or the like by the teeth 25 carried by the impeller 18, or by any other comminuting devices that may be disposed within the pulping apparatus 10. Upon becoming appropriately sized, particles will pass outwardly through holes 24 of the sizing ring 23, with such sized particles in their liquid medium being referred to as a slurry. This slurry (or water components thereof if a screen is utilized at the location 32) will enter the lower end 31 of the tubular member 30, and pass partially upwardly thereof, to a given location such as that 39 in FIG. 1, thereby compressing air above such location 39, and in the zone 42, an amount indicative of the pressure at the bottom zone 17 of the tank 11, such pressure also being indicative of the water level within the tank 11.

As the pumping apparatus 10 continues to operate, entrained air within the slurry in the zone 17, will pass into the tubular member 30, through water (or slurry) at the lower end thereof, to pass above the line 39, and to displace water originally present to that level, until such water is displaced to the level 49 or below, at which it will generally remain subject to turbulence-induced fluctuations. This causing of water displacement within the hollow tubular member 30, facilitates the use of a substantial portion of the vertically disposed tubular member 30 as a sump, thereby facilitating the elimination of fluctuations resultant from minor water level differences within the tank 11, and also resulting from turbulence caused by the rotating impeller 18.

The presence of the restricter 34 also facilitates elimination of fluctuations from the zone 42, such fluctuations being of the type discussed immediately above. The core 38 of the restricter 34, will probably be constructed of metal particles sufficiently close together that in the aggregate they function as a pressure reducer, with respect to instantaneous pressure changes within the tubular member 30 just below the restricter 34. Thus, the diaphragm 41 within the upper end 33 of the tubular member 30 will experience substantially even pressure variations, such being caused by reductions in water level within the tank 11.

Thus, a reduction in pressure caused by a reduced level of water within the tank 11, would be reflected in a rightward movement of the diaphragm 41 as viewed in FIG. 2, such that the switch element 43 would contact the switch element 44, and thereby cause a circuit with the solenoid 47 to actuate the switch 13. Similarly, a reduction in pressure within the zone 42 would cause a reduction in the visual indication of pressure observed on the dial of the gauge 51. With the opening of the valve 33 and the entry of water through the line 12 into the tank 11, the tank 11 would fill with water until the zone 42 again experienced a sufficient increase in pressure to cause a leftward movement of the diaphragm 41 such that the contact 43 would become displaced from engagement from the contact 44, such that the surface would be again open and the valve 13 would automatically close.

It will thus be apparent that such operation may continue, off and on, thereby constantly assuring a desired amount of water in the pulper 10, in order to perform its proper function, within certain prescribed limits, or on a periodic basis.

It will be apparent from the foregoing that various modifications may be made in the details of construction, as well as in the use and operation of the device of this invention, all within the spirit and scope of the invention as recited in the appended claims.

What is claimed is:

1. A pulping apparatus for use in waste disposal comprising a tank having solid waste and liquid inlet means for containing waste in a liquid medium therein, with an impeller located at a lower end of and inwardly of the tank for abrading or comminuting waste in liquid into a slurry form with discharge means being provided at the lower end of the tank for effecting a slurry discharge, with a pressure responsive means for sensing the amount of water in the tnak, said pressure responsive means comprising a generally vertically disposed tubular member closed against atmospheric pressure, with its lower end being communicatively connected to a lower inner portion of said tank, adapted for receiving liquid from said tank therein for a distance determined by the liquid pressure thereat which in turn is dependent upon the amount of liquid thereabove in the tank, with the upper end of said tubular member having an air pressure operative switch means connected therewith and being adapted to respond to the pressure of air trapped in said closed-ended tubular member by liquid received therein from said tank, said liquid inlet means having liquid delivery control means operatively connected therewith, with means operatively connecting said switch means and said liquid delivery control means in response to operation of said switch means, whereby liquid level control in the tank may be maintained, including a restricter means between the lower end of said vertically disposed tubular member, and said switch means, for dampening the effect of tank liquid level fluctuations beyond said restricter means.

2. The apparatus of claim 1, wherein means are provided for rotating said impeller to create turbulence and for causing entrainment of air particles in liquid at the lower end of said tank in the vicinity of the connection thereof to the lower end of said tubular member for entry of entrained air into the vertically disposed tubular member through liquid in the tubular member to replace a portion of the liquid in the vertically disposed tubular member.

3. The apparatus of claim 1, wherein said air pressure operative switch means includes a flexible diaphragm, movable dependent upon air pressure in the upper end of said tubular member.

4. The apparatus of claim 1, including a pressure gauge operatively connected to the upper end of said vertically disposed tubular member for indicating the numerical pressure differential thereof above atmospheric pressure.

5. The apparatus of claim 1, wherein said restricter means is of the air-permeable porous metal type.

6. The apparatus of claim 1, wherein said liquid delivery control means comprises a valve in said liquid inlet means.

7. The apparatus of claim 6, wherein said valve is solenoid operated, with the solenoid being actuable by said switch means.

8. A pulping apparatus for use in forming solid material and liquid into a slurry, said apparatus comprising tank means for holding the solid material and a liquid medium therein, conduit means for conducting liquid medium to said tank means, valve means for controlling the flow of liquid medium through said conduit means to said tank means, impeller means for promoting the formation of a slurry of the solid material and liquid medium in said tank means, and detector means for detecting variations in the amount of the liquid medium in said tank means, said detector means including upwardly extending tube means for receiving liquid medium from said tank means in a lower portion of said tube means and for holding gas in an upper portion of said tube means at a pressure which varies as a function of variations in the amount of liquid medium in said tank means, said tube means having a lower end connected in fluid communication with the interior of said tank means and a closed upper end, sensor means for sensing a change in the pressure of the gas at a sensing location in the upper portion of said tube means for initiating operation of said valve means in response to a variation in the pressure of the gas at the sensing location to thereby vary the amount of liquid medium in said tank means, and restricter means disposed in the upper portion of said tube means between an upper surface of the liquid medium in said tube means and said sensing location for dampening the effect of transient variations in the level of the liquid medium in said tank means on the pressure of the gas at said sensing location.

9. A pulping apparatus for use in forming solid material and liquid into a slurry, said apparatus comprising tank means for holding the solid material and a liquid medium therein, conduit means for conducting liquid medium to said tank means, valve means for controlling the flow of liquid medium through said conduit means to said tank means, impeller means for promoting the formation of a slurry of the solid material and liquid medium in said tank means, and detector means for detecting variations in the amount of the liquid medium in said tank means, said detector means including an upwardly extending tube having a lower end connected in fluid communication with the interior of said tank means and an upper portion, sensor means connected with the upper portion of said tube for detecting a change in the level of the liquid medium in the lower portion of said tube and for initiating operation of said valve means in response to a variation in the level of the liquid medium in the lower portion of said tube to thereby vary the amount of liquid medium in said tank means, and restricter means disposed in the upper portion of said tube between an upper surface of the liquid medium in said tube and said sensor means for dampening the effect of transient variations in the level of the liquid medium in said tank means on the gas medium in the upper portion of said tube adjacent to said sensor means.

* * * * *